April 16, 1963 H. R. SOBECK 3,085,381
TWO-STAGE OIL SEPARATOR
Filed May 25, 1960 3 Sheets-Sheet 1
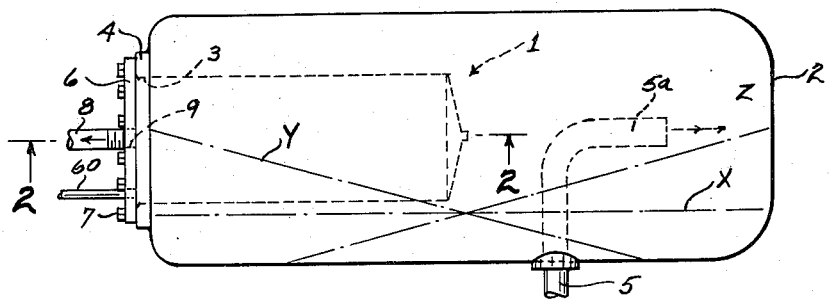
INVENTOR.
HAROLD R. SOBECK
BY
Meyer, Baldwin, Doran & Young
ATTORNEYS

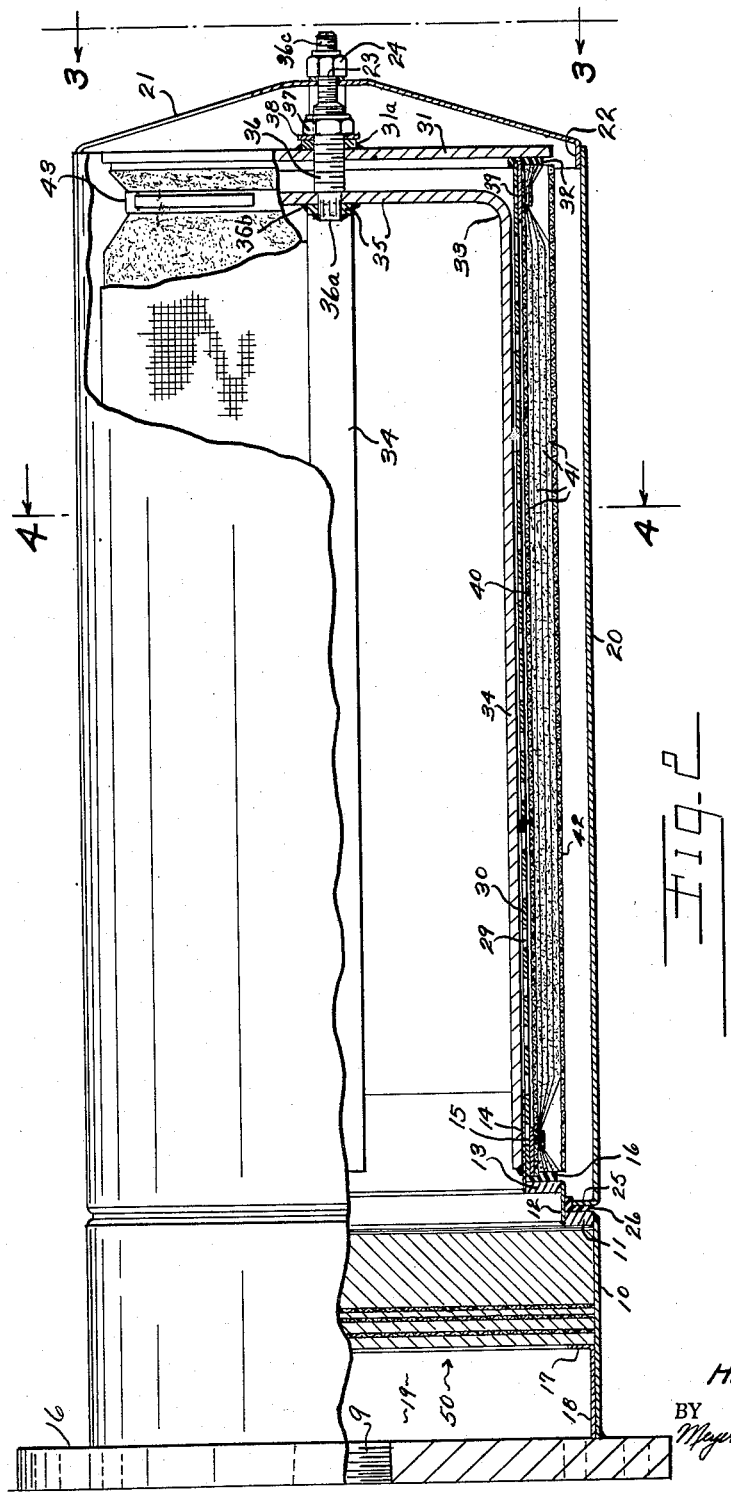

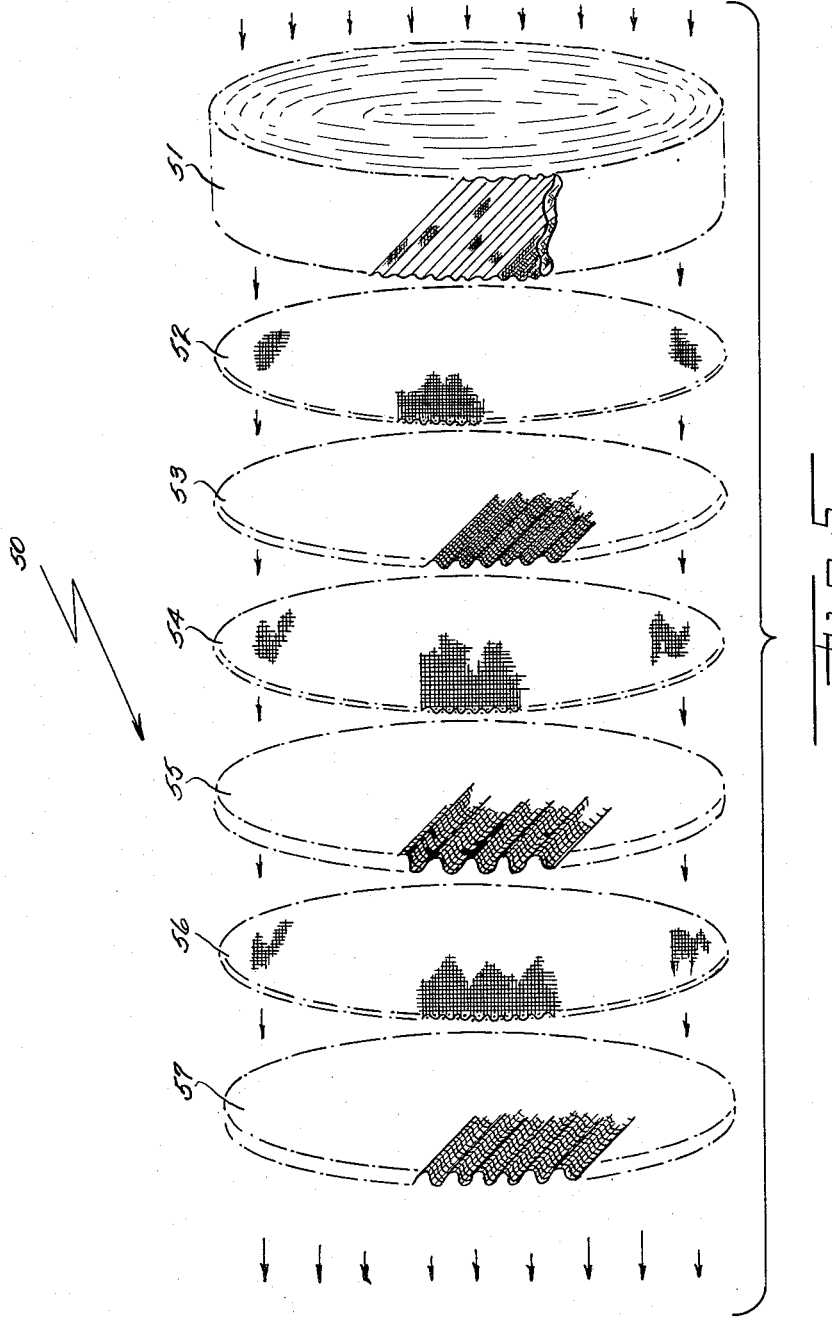

United States Patent Office 3,085,381
Patented Apr. 16, 1963

3,085,381
TWO-STAGE OIL SEPARATOR
Harold R. Sobeck, Novelty, Ohio, assignor, by mesne assignments, to Rockwell Standard Corporation, Coraopolis, Pa., a corporation of Pennsylvania
Filed May 25, 1960, Ser. No. 31,728
8 Claims. (Cl. 55—323)

This invention relates to oil separators and particularly to a two-stage separator for disentraining oil from air discharged by a rotary compressor used on a portable vehicle.

Oil is commonly entrained in the air which enters or is being compressed within a rotary type compressor for purposes of cooling and lubricating the machine. As a result, the air leaving the compressor contains an oil mist or fog making it unsuitable for the operation of air brakes, air clutches, or certain types of air powered tools which may be on the vehicle or used in connection therewith. It may also be desirable to recover the oil from the exhausting air for reuse in the compressor.

It is therefore, the general object of this invention to provide a device of the above type for disentraining oil or oil mist from the output air of a rotary type compressor.

Another object of this invention is to provide an oil separator which is particularly adapted for use on wheeled or other portable vehicles.

Still another object is to provide a device of the above type wherein the air is filtered in two different stages.

A further object is to provide a device of the above type which can be tilted at a substantial angle without interfering with the operation thereof.

Another object of this invention is to provide a separator having the above characteristics wherein the filter portion is readily replaceable.

Yet another object of this invention is to provide such a device which is simple and economical in construction and highly efficient in use.

Further objects of the invention and the invention itself will be understood from the following specification and the accompanying drawings, in which said drawings:

FIG. 1 is a side elevational view of one installation of the two-stage oil separator of this invention;

FIG. 2 is a partial longitudinal section of the oil separator of this invention;

FIG. 3 is an end view of the oil separator of FIG. 2 as viewed from the line 3—3 of FIG. 2;

FIG. 4 is a transverse section taken along the line 4—4 of FIG. 2; and

FIG. 5 is an exploded view of a portion of the filtering means used in the oil separator of this invention.

Referring now to the drawings in all of which like parts are designated by like reference characters and particularly to FIG. 1, the two-stage oil separator of this invention as herein illustrated and described is shown at 1 installed within a tank or receiver 2. It will be understood that the tank 2 is installed in any suitable manner in connection with a compressor (not shown) and is particularly adapted for use on a wheeled vehicle in conjunction with a rotary type compressor.

The tank 2 is preferably elongated in shape and is provided at one end thereof with an aperture 3 surrounded by a circumferentially continuous, longitudinally projecting collar 4. An inlet pipe 5 which is connected to the output side of the compressor enters the tank 2 and is provided internally of said tank with a right angularly bent portion 5a. The bent portion 5a is disposed generally coaxially with the tank 2, the open end of said bent portion being adjacent and directed toward the end wall of said tank which is opposite the aperture 3 and the collar 4 thereby preventing the air flow from impinging directly on the oil separator.

The separator 1 projects inwardly into the tank 2 through the aperture 3, an outwardly disposed end of said separator being provided with a rigidly mounted closure plate 6 which radially overlaps the collar 4. The closure plate 6 is securely fastened to the collar 4 by means of bolts 7 which project through suitable openings in the overlapping portion of the closure plate and are thread fitted into said collar. An outlet pipe 8 is thread fitted into an aperture 9 of the closure plate 6 whereby the air which enters the tank 2 through the inlet pipe 5 is directed to a suitable storage container or to air using equipment after passing through the oil separator 1.

Referring now to FIGS. 2–5, the separator 1 comprises a drum like base 10 to which are rigidly secured a pair of coaxial, longitudinally extending, tubular members 20 and 30. The tubular member 20 comprises an imperforate, sleevelike shroud which is of substantially the same diameter as the base 10 and which surrounds the tubular member 30. The tubular member 30 is spaced radially inwardly from the shroud 20 and constitutes a frame for the mounting of filter material to be herein later fully described. The tubular member or frame 30 is provided with a plurality of apertures 29 throughout the length and circumference thereof to allow the passage of a gaseous medium therethrough. The apertures 29 may be of any suitable size and number whereby they allow a free flow of air through the frame 30. For example, ½ inch holes on 11/16 inch centers has been found to be quite satisfactory.

The inner end of the base 10 is provided with a radial spacing ring 11 which is snugly telescoped within said base adjacent the edge thereof and securely fixed to the base by welding or other suitable means. A sleeve like ring 12 is similarly telescoped within the inner periphery of the spacing ring 11 and welded to said spacing ring. The sleeve like ring 12 extends inwardly beyond the spacing ring 11 and is provided with a smaller spacing ring 13 welded thereto in the manner of securing the spacing ring 11. The perforate frame 30 has an inner diameter which is the same dimension as the inner periphery of the relatively smaller spacing ring 13, and a connecting sleeve 14 is welded to both the inner periphery of said frame and the inner periphery of said smaller spacing ring thereby guiding and securing the perforate frame in place. A metal band 15 is telescoped over the outer periphery of the frame 30 adjacent the proximal end of said frame and is welded in place. A resilient washer 16 is positioned upon the inwardly directed face of the smaller spacing ring 13 and is interposed between said spacing ring and the end of the frame 30 and the band 15.

The distal end of the perforate frame 30 is closed by means of a closure plate 31 which is sealed against the inwardly projecting edge of said frame by means of a resilient washer 32 which is interposed between said closure plate and the end of the frame. The closure plate 31 is held tightly against the inner end of the frame 30 by means of a pair of support members 33 which are securely mounted within said frame.

The support members 33 comprise a pair of preferably metal bars bent into U-shape, each having parallel, elongated legs 34 and a transverse connecting portion 35. The distal ends of the legs 34 are welded or otherwise suitably secured at the inner periphery of the connecting sleeve 14 at circumferentially evenly interspaced positions on said periphery. The connecting portions 35 are disposed at right angles relative to each other and are centrally apertured to receive a non-threaded portion 36a of a bolt member 36. The support members 33 are preferably welded together centrally of their connecting portions 35, and the non-threaded portion 36a is welded or otherwise suitably secured at the end thereof to the adjacent connecting portion.

The bolt member 36 is threaded and is of a larger diameter than the non-threaded end portion 36a thereby providing a shoulder 36b which prevents longitudinal displacement of the support members 33 relative to said bolt member. The bolt member 36 projects through a centrally disposed aperture 31a in the closure plate 31, said closure plate being pulled tightly against the distal end of the frame 30 by means of a nut 37 and a washer 38.

The bolt member 36 is provided with a diametrically reduced, threaded portion 36c which extends inwardly beyond the nut 37 and provides means for securing the shroud 20 in place. A pair of right angularly crossed braces 21 are welded or otherwise suitably secured to the inner periphery of the shroud 20 adjacent the open, inner end of said shroud as indicated at 22. The braces 21 are apertured at 23 at the point where said braces cross whereby they are telescoped over the reduced, threaded portion 36c. The braces 21 are secured in place by means of a nut 24.

The end of the shroud 20 which is disposed adjacent the base 10 is provided with a circumferentially continuous, radially inwardly projecting flange 25. A sealing washer 26 of suitable resilient material is interposed between the spacing ring 11 and the inwardly turned flange 25, said sealing ring being compressed by the tightening of the nut 24 which presses upon the braces 21. The shroud is thereby effectively sealed relative to the base 10.

The sleevelike, perforate frame 30 is wrappd by a plurality of layers of filtering material which extend throughout the length of said frame. The inwardly directed or distal end of the frame 30 is provided with a preferably metal band 39 surrounding its outer periphery, said band being similar to the band 15 adjacent the proximal end. The bands 15 and 39 are welded or otherwise suitably secured in place whereby the perforate frame 30 is effectively sealed adjacent the ends thereof. The washer 16 further seals the outwardly directed end of said frame against the spacing ring 13, and the washer 32 seals the opposite end of said frame against the closure plate 31. In this way, air is forced to pass through the frame 30 intermediate the bands 15 and 39.

The perforate frame 30 is wrapped with an inner screen 40 which overlaps the metal bands 15 and 39 at the ends of said frame. Said frame 30 is then incased in a plurality of layers of fiber glass batting which also extend throughout the length of said frame with the end edges of the fiber glass layers extending over the bands 15 and 39 in either direction. The layers 41 of fiber glass batting are in turn surrounded by a protective screen 42. The screens 40 and 42 are for the purpose of maintaining the fiber glass batting in position and protecting it and may be of any suitable screening material which will allow unrestricted flow of air through the fiber glass layers. The ends of the layers 41 are further secured upon the frame 30 by means of sheet metal straps 43 which surround the batting in the areas of the bands 15 and 39. Because of the tightly fitting bands 43 and the fact that the end edges of the drum 30, to which are affixed the bands 15 and 39, abut the washers 16 and 32, all of the air flow is forced to pass through the said layers intermediate the metal straps 43.

It will be understood that the fiber glass batting as herein illustrated and described is given as an example only of one type of material which is suitable for incasing the frame 30. Other materials may be used which have the same general filtering characteristics of the fiber glass herein used.

Fiber glass batting which has been found to be highly successful when used in the oil separator of this invention comprises sheets or layers having a nominal or uncompressed thickness of between 3/8 and 3/4 of an inch. The fiber glass filaments are .00004 inch in diameter and are of such density as to weigh .6 pound per cubic foot of the material. One successful embodiment comprises a batting having a nominal thickness of 1/2 inch per layer which is wrapped tightly upon the frame 30 around the protective screen 40 whereby four of the layers 41 equaling a nominal thickness of 2 inches are reduced or pulled down to a thickness of approximately 1/2 inch.

The filtering material as set forth above when installed as specified is capable of disentraining oil from the very fine oil mist or fog which comes from the compressor. The air stream enters the open end 22 of the shroud 20 and passes through the layers 41 of batting and the perforate frame 30 into the interior of said frame during which time the closely packed, tiny filaments of the fiber glass disentrain the extremely minute particles of oil. The batting thus becomes soaked with the oil and due to the pressure drop across the material becomes matted to a thickness of between 1/8 and 3/16 of an inch. Eventually the batting becomes permeated with oil to the point of complete saturation, and due to the continuing flow of air the oil that has accumulated in the glass batting is blown into the interior of the perforate frame 30 in the form of relatively larger droplets or particles than that found in the incoming mist or fog. It will be understood, therefore, that the oil which is entrained in the air coming from the compressor enters the fiber glass batting in the form of a mist or fog and is therein collected or agglomerated into droplets of oil of relatively substantial size which are re-entrained into the mass of flowing air.

After the stream of air has passed through the fiber glass layers 41, it moves through a second filtering element generally indicated at 50 before being exhausted through the outlet pipe 8. The filtering element 50 comprises a plurality of layers of filter material and is held captive within the base 10 between the spacing ring 11 and an inwardly directed flange 17 of a spacer sleeve 18. The spacer sleeve 18 is adapted to slidably telescope within the base 10 adjacent the closure plate 6 and is of such axial dimension that the flange 17 is spaced generally in the medial region between the ends of said base. The space thus provided between the closure plate 6 and the second filtering element 50 comprises a compartment 19 into which the disentrained oil is eventually deposited.

Referring now to the exploded view of FIG. 5, the second filtering element 50 comprises layers of filtering material of varying density which progressively becomes more open and less dense in the direction of the air stream flow. Said filtering element 50 comprises a relatively thick, spirally wound filter 51 and three crimped filters 53, 55, and 57. A flat disk 52 made of wire screen is interposed between the spiral filter 51 and the crimped filter 53, a similar disk 54 is interposed between the crimped filters 53 and 55, and a third disk of screen indicated at 56 is interposed between the crimped filters 55 and 57.

The spiral filter 51 is manufactured from knitted mesh formed into a sleeve which is subsequently flattened and transversely obliquely crimped, preferably at an angle of 45°. The mesh is preferably formed of wire no more than .007 inch in diameter and may be even finer. Crimps which are 3/16 inch deep and spaced 7/16 inch apart have been used with excellent results. The knitted mesh thus formed is then tightly spirally wound upon itself to the proper diameter for filling the base 10 the completed filter having a weight density of substantially .11 oz. per cubic inch. The filter 51 is, therefore, moderately dense and is particularly adapted to collect the droplets of oil which are blown free of the layers 41 and the perforate frame 30.

The crimped filter 53 is manufactured from 8 x 8 hardware cloth which has been crimped in accordion like pleats and cut to conform to the inner periphery of the base 10. The crimped filter 55 is similarly formed from 5 x 5 hardware cloth as is the filter 57 which is manufactured from 3 x 3 hardware cloth. All of the filters 51, 53, 55, and 57 are stacked in layers with the disks 52, 54, and 56 interposed therebetween to form the complete filtering element 50. The air stream entering the filter element 50 first passes through the relatively densest part of said filter which is the spirally wound, knitted mesh shown at 51. The small droplets of oil which have been re-entrained in the air stream are disentrained by the spiral filter 51 and caused to collect and flow along the wires of the knitted mesh. The constantly moving stream of air moves the oil along with it from the filter 51 through the disk 52 and thereafter successively through the remaining filters and disks. Each of the progressively coarser filters 53, 55, and 57 causes the moving oil to collect in progressively larger drops. The filter 51 is of such density that the oil collected therein does not drain easily whereas the coarsest or most open of the filters 57 is such that the oil drains easily therefrom. Also, by the time the oil has progressed from the spiral knitted mesh filter 51 to the final filter 57, the drops of oil have become so large that they will no longer become entrained in the moving air but will, rather, collect and drain downwardly into the bottom of the compartment 19. Clean air with substantially all of the oil removed thereafter passes through the outlet pipe 8. A return pipe 60 is trapped through the closure plate 6 adjacent the bottom of the compartment 19 whereby oil collected in said compartment is directed back to the compressor. The returning oil may, for example, be connected into the suction side of a single stage compressor or it may be connected between the stages of a two stage compressor. In either case, the oil may be reused for purposes of cooling and lubricating the compressing device. Alternatively, the oil which collects in the compartment 19 may be directed to the tank or receiver 2 to be stored therein by conventional pumping means (not shown) if that is more desirable.

Referring now to FIG. 1, the air which enters through the inlet pipe 5 which is directed against the end wall of the tank 2 is most heavily ladened with oil and although being primarily in the form of a fog or mist, may also include some droplets of oil. The larger droplets or particles will tend to collect on the end wall of the tank 2 and eventually run downwardly to the bottom of said tank. Additionally, some oil will drain off of the saturated layer 41 and will drain out of the open end 22 of the shroud 20 into the bottom of said tank. If the oil from the compartment 19 is pumped back to the tank 2, this adds further to the accumulation within the tank and the level of the oil may rise to within a short distance of the shroud 20. This possible level of the oil is indicated by the broken line X in FIG. 1. If at this time the tank or receiver 2 is tilted longitudinally as may happen on a portable vehicle which is traveling over uneven ground or permanently stationed on a sloped surface, the liquid level will tend to tilt relative to the tank and the oil separator 1 therein as indicated by the oblique broken lines Y and Z. However, under these conditions the operation of the oil separator is not interfered with due to its construction and the disposition of the various parts within the tank 2. When the tank 2 is tilted whereby the fluid level is at Y, none of the oil which has collected in the bottom of the tank can enter the oil separator 1 due to the presence of the shroud 20 which is sealed to the base 10 at the spacing ring 11 by means of the sealing ring 26. If the tank 2 is tilted in the opposite direction and the fluid level is at Z, said fluid level is below both the oil separator 1 and the bent portion 5a of the inlet pipe 5 and the operation of the entire device is still not interfered with. It will be readily seen, therefore, that the installation of the two-stage oil separator of this invention as herein illustrated and described is particularly adapted for use on wheeled vehicles.

Under conditions where tilting of the tank 2 is not a problem such as would be the case in a stationary installation, the shroud 20 may be dispensed with. The oil separator will under those circumstances operate in all respects in the same manner as herein above described. The oil mist or fog will pass through the filter layers 41 wherein the very fine oil particles will be disentrained from the air to collect adjacent the frame 30 and there be re-entrained into the air stream in the form of relatively larger particles or droplets. The larger droplets are then recollected and disentrained in the second filtering element 50 wherein they are progressively formed into larger droplets until such time as they drain downwardly from the final filter 57 into the compartment 19. The oil laden air from the compressor thus passes through two separate stages of filtration. In the first stage which comprises the layers 41 of batting, the oil mist is disentrained and formed into larger droplets to be re-entrained into the air stream. In the second stage, the relatively larger droplets are disentrained from the air and caused to collect into even larger drops which ultimately drain into the compartment 19.

The embodiment of the oil separator 1 of this invention as herein illustrated and described is particularly adapted for use in installations wherein space is at a premium, such as would be found on a wheeled vehicle. By adopting the two stage, re-entrainment principle as set forth above, it is possible to remove practically 100% of the oil from the discharged air with a separator of relatively small size. The practical advantages of this development will be readily appreciated by those familiar with the art.

To assure the proper removal of the oil particles, the first stage of the filter (batting layers 41) is adapted for both removing the tiniest particles from the mist or fog and also re-entraining the oil at the proper droplet size which will enable the second stage (filtering element 50) to again disentrain the oil. The size of the first stage is also a factor to be considered since the re-entrained droplets must not exceed in quantity that amount which can be disentrained by the second stage.

In the present embodiment, the area presented to the air flow of the first stage is approximately eight times the corresponding area of the second stage. By use of this 8–1 ratio in conjunction with the filtering materials as described, excellent results have been achieved. It has been found that the re-entrained droplets emitted from the first stage are maintained at a particle size of 30 microns or greater and that the second stage, for all practical purposes, removes all of these particles. If the knitted mesh filter 51 is properly formed as disclosed, all of the oil droplets entering the second stage will be disentrained at that point, the remaining filters and screens (52–57) serving the purpose of collecting and draining the oil only.

The foregoing is given by way of example only of one successful embodiment of the present invention, and it will be understood that many departures from the details set forth may be made without, however, departing from the spirit of the invention or the scope of the appended claims.

What is claimed is:

1. An oil separator for disentraining oil mist from a gaseous stream comprising a hollow perforate frame into which said gaseous stream is directed; a hollow base upon which said frame is mounted and through which said gaseous stream is ejected; said frame closed at the end thereof opposite said base and incased in filtering material; said base containing layers of filters which progressively decrease in density in the direction of stream flow; said base having a compartment downstream from a filter of least density for collecting and discharging disentrained oil.

2. A two-stage oil separator for disentraining oil mist from a gaseous stream comprising a hollow, perforate frame into which said gaseous stream is directed; a hollow base upon which said frame is mounted and through which said gaseous stream is ejected; said frame enclosed at the end thereof opposite said base and incased in filtering material; said filtering material adapted to disentrain and collect oil mist and re-entrain it into the gaseous stream in the form of relatively larger droplets; said base containing filter means adapted to disentrain said larger droplets and cause the oil to drain from said filter means; said base having a compartment downstream from said filter means for collecting disentrained oil.

3. An oil separator for disentraining oil mist from a gaseous stream comprising a hollow perforate frame into which said gaseous stream is directed; a hollow base upon which said frame is mounted and through which said gaseous stream is ejected; said frame closed at the end thereof opposite said base and incased in fiber glass batting; said base containing layers of filters which progressively decrease in density in the direction of stream flow; said base having a compartment downstream from a filter of least density for collecting and discharging disentrained oil.

4. A two-stage oil separator for disentraining oil mist from a gaseous stream comprising a hollow, perforate frame into which said gaseous stream is directed; a hollow base upon which said frame is mounted and through which said gaseous stream is ejected; said frame enclosed at the end thereof opposite said base and incased in fiber glass batting; said batting being of such filament size and density as to disentrain and collect oil mist and re-entrain it into the gaseous stream in the form of relatively larger droplets; said base containing filtering means adapted to disentrain said larger droplets and cause the oil to drain from said filter means; said base having a compartment downstream from said filter means for collecting disentrained oil.

5. A two-stage oil separator as set forth in claim 4 wherein the recited filtering means comprises layers of filters which progressively decrease in density in the direction of stream flow.

6. Separator means of the type described for disentraining oil from a moving stream of oil laden air; said separator means comprising a tank; said tank having an outlet pipe therein; an oil separator disposed over said outlet pipe; an inlet pipe delivering air into said tank and terminating with its open end directed away from said oil separator; said oil separator comprising a base and a hollow, perforate frame projecting into said tank; said frame closed at the inner end thereof; said frame incased in filtering material; said base containing additional filtering material and a compartment for collecting disentrained oil.

7. Separator means of the type described for disentraining oil from a moving stream of oil laden air; said separator means comprising a tank; an inlet pipe delivering air into said tank and terminating with its open end directed against one end of said tank; the opposite end of said tank having an outlet pipe therein; filter means disposed over said outlet pipe and compelling all discharge from said tank to flow through said filter means; said filter means comprising a base and a hollow, perforate frame projecting into said tank; said frame closed at the inner end thereof; said frame incased in layers of compressed, glass batting; an imperforate sleeve surrounding said frame in radially spaced relation to said batting; said sleeve mounted to said base and sealed relative thereto; said base containing additional filtering material and a compartment for collecting disentrained oil.

8. Separator means of the type for disentraining oil from a moving stream of oil laden air and adapted for use on a portable vehicle; said separator means comprising an elongated tank; an inlet pipe delivering air into said tank adjacent one end thereof and directing a stream of air against the adjacent end wall; an outlet in the opposite end wall; an oil separator disposed within said tank over said outlet and projecting longitudinally inwardly from said opposite wall; said oil separator comprising a hollow, perforate frame into which said stream of air is directed; a hollow base upon which said frame is mounted and through which said stream passes to be ejected from said outlet; said frame enclosed at the end thereof opposite said base and incased in filtering material; said filtering material adapted to disentrain and collect oil mist and re-entrain it into said stream in the form of relatively larger droplets; said base containing filter means adapted to disentrain said larger droplets and cause the oil to drain from said filter means; said base having a compartment downstream from said filter means for collecting disentrained oil.

References Cited in the file of this patent

UNITED STATES PATENTS

| | | |
|---|---|---|
| 1,379,056 | Smith | May 24, 1921 |
| 1,456,417 | Bement | May 22, 1923 |
| 2,047,634 | Jacobs | July 14, 1936 |
| 2,059,017 | Nickle | Oct. 27, 1936 |
| 2,106,218 | Krieck | Jan. 25, 1938 |
| 2,521,785 | Goodloe | Sept. 12, 1950 |
| 2,695,679 | Hoffman et al. | Nov. 30, 1954 |
| 2,745,513 | Massey | May 15, 1956 |
| 2,753,951 | Glanzer et al. | July 10, 1956 |
| 2,770,320 | Dreznes | Nov. 13, 1956 |
| 2,885,027 | Green | May 5, 1959 |
| 3,022,859 | Sexton | Feb. 27, 1962 |